Patented June 16, 1942

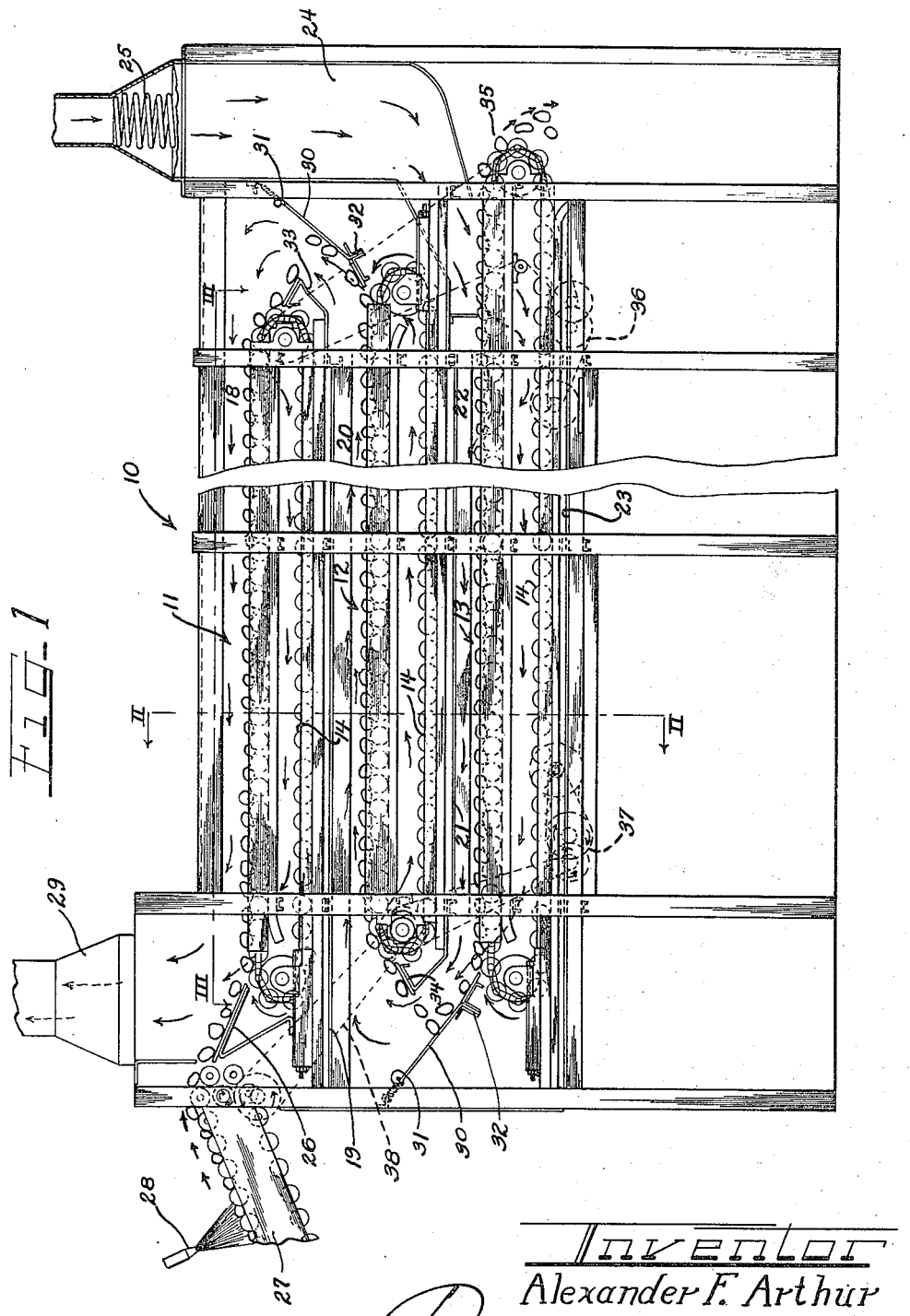

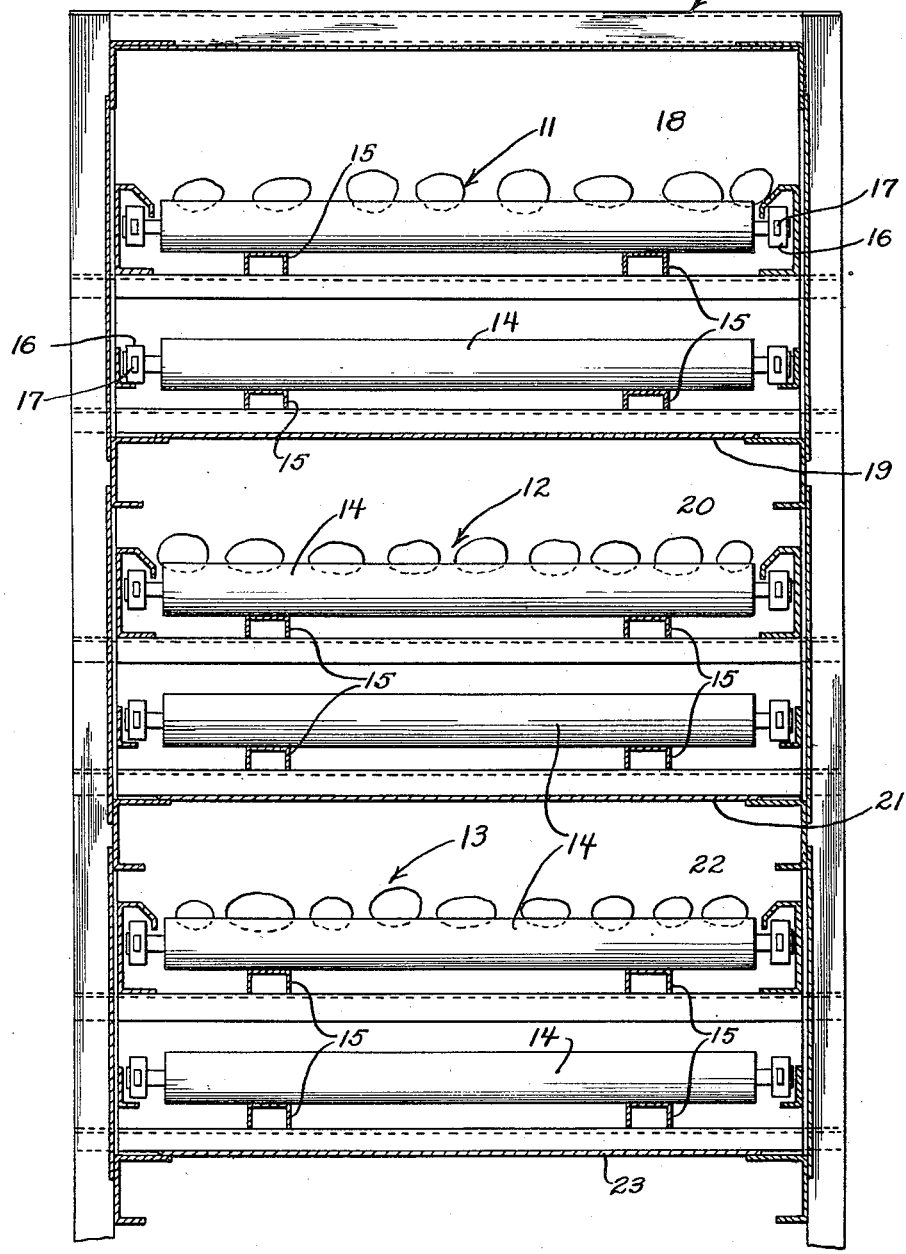

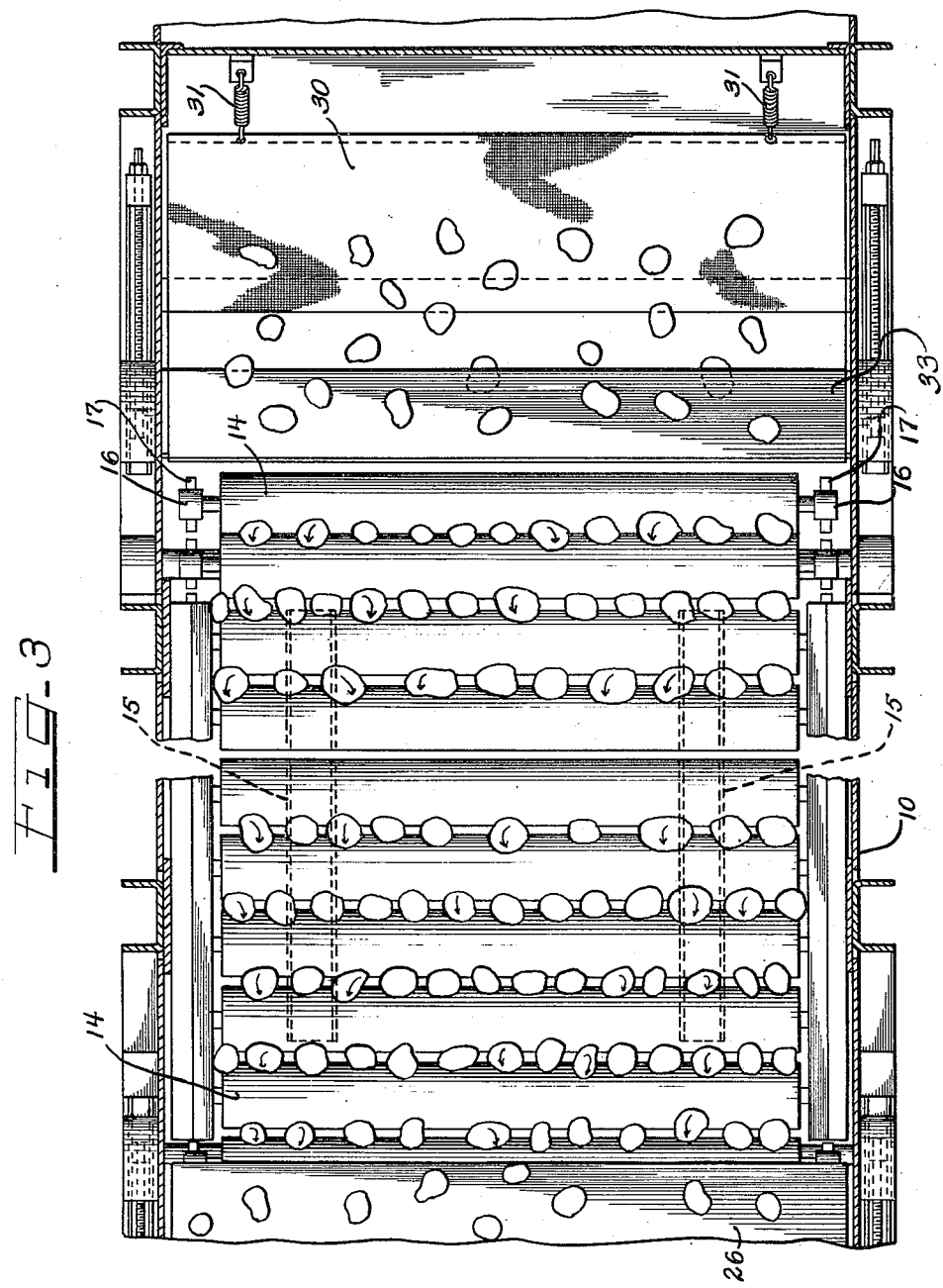

2,286,705

UNITED STATES PATENT OFFICE 2,286,705

APPARATUS FOR TREATING POTATOES FOR SHIPMENT

Alexander F. Arthur, Homestead, Fla., assignor, by mesne assignments, to Frederick C. Peters, Miami Beach, Fla.

Application March 29, 1940, Serial No. 326,618

1 Claim. (Cl. 34—203)

This invention relates to the treatment of edibles such as vegetables and fruits for shipment, and more particularly to a process of and apparatus for drying such edibles, and particularly potatoes, in such a way that deterioration of such edibles is substantially prevented during shipment of the same.

In the past, packers of vegetables such as potatoes have experienced relatively great losses in the transportation of potatoes due to the development of bacterial soft rot. This decay is caused by the organism *Bacillus carotovous*, and its development is favored by the presence of free moisture on the skin of the product.

Attempts have been made to remove this moisture by various treatments, but these treatments prior to the applicant's invention were not found to be very practical or at least were never commercialized.

Heating of the product is not considered to be feasible on account of the fact that it was believed that in order to heat the product to an extent sufficient to effect the desirable result the body of the edible or potato would have to be likewise heated or cooked.

Now I have ascertained that it is feasible to submit potatoes to a relatively high degree of heat which is sufficient to remove deleterious growth forming moisture in the potatoes and yet at the same time not in any way heat or affect the body of the potato. I have accomplished this result by first moistening the potatoes so that they are each covered with a film of moisture prior to their introduction into a heating chamber. By first moistening the potatoes, I have further ascertained that the evaporation of the moisture from the skin of the potato not only enables the driving off of all the deleterious moisture in the skin or, in other words, the skin drying of the product, but in addition thereto serves to maintain the inside or body of the potato cool and unaffected by the heat employed in the processing of the product.

Accordingly, it will be appreciated that the object of this invention is to so process or treat vegetables and fruits, and especially potatoes, that the product may be rendered substantially free from the development of soft rot during shipment and whereby the product may be preserved for a relatively long period of time after packing without the same becoming spoiled.

In accordance with the general features of this invention, there is provided a process for treating such edibles like potatoes which comprises first moistening the skins of the edibles to prevent cooking and undue heating of the edibles during subsequent steps of the process, then conveying the moist edibles in a confined area of predetermined size and for a predetermined period of time, subjecting the edibles as they travel through the area to heated blasts of air of such volume and temperature as to skin dry the edibles, and utilizing the evaporation of the moisture from the skins of the edibles to preclude heating of the portions of the edibles inside the skins.

In accordance with other features of the invention, there is provided an apparatus for practicing this process which includes suitable means for first moistening the edibles, a drying chamber of predetermined size into which the moistened edibles are delivered, conveying means in the chamber for conveying the edibles from the inlet of the chamber to the outlet, and means for forcing the heated air into the chamber and over and about the edibles on the conveyor means and in such a manner as to effect skin drying of the edibles without cooking them.

Another feature of the invention relates to the provision in such an apparatus, as above described, of means for causing a relative movement of the heated air and edibles, so that substantially the entire outer surface of each edible is subjected to the drying action of the air. This feature is accomplished by causing the potatoes or other edibles as they travel through the heated chamber to be constantly turned or rotated.

Still another feature of the invention relates to the provision, in the chamber and in the air path through which the edibles travel, of means for cushioning the edibles against bruising as they are discharged from one conveyor of the conveying means for delivery to a succeeding conveyor in the path.

Other objects and features of this invention will more fully appear from the following detailed description taken in connection with the accompanying drawings which illustrate a single embodiment thereof, and in which:

Figure 1 is a side view partly in section and partly broken away, and with parts removed, of an apparatus for practicing the process of my invention;

Figure 2 is an enlarged fragmentary sectional view taken on the line II—II of Figure 1 looking in the direction indicated by the arrows; and Figure 3 is an enlarged fragmentary sectional view taken on the line III—III of Figure 1 looking downwardly.

As shown on the drawings:

The reference character 10 designates generally a drying chamber or housing in which a product such as potatoes is adapted to be treated in accordance with the process of my present invention. This chamber 10 may be made of any suitable construction and is of a size sufficient to allow the potatoes to be conveyed therein and subjected to the heated air for a sufficiently great period of time to enable the desired skin drying results.

The chamber that I have illustrated is fabricated from metallic strips, angle irons, and sheet metal and is preferably of relatively great length such, for example, as forty or more feet, so as to enable the potatoes being conveyed to remain in the heated area for the requisite or allotted period of time. In practice I have found that under the temperature and air conditions employed in this apparatus desirable results are obtained by allowing the potatoes to remain in the chamber for a period of approximately four minutes.

In Figure 1, I have illustrated the chamber as having side panels removed in order to show the construction of the series of conveyors 11, 12, and 13 disposed therein one above the other. These conveyors are each of the endless chain type and are made up of a plurality of rollers 14 which extend transversely of the conveyor. This roller type of endless conveyor may be of any suitable or conventional construction.

As shown in Figure 2, the rollers 14 of these conveyors bear against tracks 15 on the under sides of the rollers, so that as each conveyor advances the rollers are caused to turn on their longitudinal axes. That is to say, each end of each of the rollers is rotatably journalled in an element 16 connected to and comprising a part of the associated endless chain 17. This construction, as noted before, may be of any conventional or suitable type and for that reason has not been illustrated in detail.

Each of the conveyors is disposed in a separate compartment of the housing 10, which compartments are in series connection so that they together define a tortuous or serpentine path through which heated air is adapted to be blown in the treatment of the product. The upper conveyor 11 is positioned in a compartment 18 located above a transverse partition 19. The intermediate conveyor 12 is disposed in a central compartment 20 defined on its top by the transverse or horizontal partition 19 and on its bottom by the horizontal partition 21. The lowermost conveyor 13 is disposed in a bottom compartment 22 defined on its top in part by the partition 21 and on its bottom by the bottom 23 of the housing.

The right hand end of the bottom compartment 22, as shown in Figure 1, is disposed in communication with the downwardly extending air duct 24 through which heated air is delivered into the series of interconnected compartments. This duct 24 may have disposed in it a suitable heating coil such, for example, as steam heating or hot water coils 25 over which a blast of air may be forced by means of any suitable device such, for example, as a blower (not shown). Heating of this air may be suitably controlled by means of conventional thermostatic equipment, which does not per se constitute any part of this invention. I have obtained excellent results with the equipment illustrated by using blasts of air having approximately a temperature of 145° F. upon entry into the chamber 22 and having approximately a velocity of 1200 feet per minute.

At this time it should be noted that the air travels through the tortuous path defined by the compartments 22, 20, and 18 in an opposite direction from the forward travel of the potatoes being conveyed through the heating zone. This arrangement results in the potatoes during their last stage of movement through the drying housing being subjected to the highest temperature and to their being subjected to the least temperature upon their travel through the first or initial heating zone 18. The manner in which this is accomplished will become more evident as the description progresses.

The left hand end of the compartment 22, as illustrated in Figure 1, is connected by a bend or turn to the left hand end of the compartment 20. Also, the right hand end of the compartment 20 is connected by a similar turn or bend to the right hand end of compartment 18 at the top of the housing.

As noted before, the upper compartment 18 constitutes a first compartment through which the potatoes entering the apparatus travel, and as a consequence the left hand end of conveyor 11 is positioned to have potatoes discharged thereon by means of an inclined slide 26. This inclined slide or board 26 may be of any suitable construction and has its uppermost end aligned with the discharge end of an endless potato feeding conveyor 27 which extends into a suitable opening in the upper left hand corner of the housing 10. This conveyor may likewise be of any suitable construction and has positioned over it suitable spraying nozzles 28 for moistening the potatoes being lifted to the upper left end of the housing.

The upper left hand end of the housing 10, as illustrated in Figure 1, has connected to it a discharge conduit 29 for conveying the moisture laden air from the housing after the air has traversed the serpentine path defined by the three compartments 22, 20, and 18. This conduit 29 is positioned so as to be in communication with the upper left hand end of the compartment 18 and whereby the air after traversing this last compartment leaves the housing by way of the conduit 29.

The arrows in the compartments 18, 20, and 22, as well as in the conduit 24 and in the conduit 29, indicate the path of the heated air as it traverses through the heating chamber and leaves the same.

In each of the two bends previously referred to, there is disposed a partition member or device for aiding in defining the path of the air and also for serving as a cushioning device against which potatoes leaving the end of an adjoining conveyor are adapted to impinge as they gravitate to the next succeeding conveyor. Since these two devices or partitions are the same, the description of one will suffice for both. Each of these devices comprises a piece of flexible material such, for example, as canvas 30 having an upper end attached by means of springs 31 to a side wall of the housing 10 and having a lower end fastened to a suitable bracket construction 32 extending transversely of the housing and suitably anchored thereto. Referring to Figure 1, it will be perceived that as the potatoes move forward on conveyor 11 toward the right hand end of the housing they drop off of the conveyor onto an inclined platform 33 and then gravitate to and impinge against the flexible cushioning canvas 30 which directs the potatoes onto the receiving end of the conveyor 12 which moves in an opposite direction from the conveyor 11.

Similarly, when the potatoes leave the intermediate conveyor 12, they gravitate along an inclined table or platform 34 from which they fall along onto the flexible canvas 30 and are delivered or directed by this canvas onto the receiving end of the lowermost conveyor 13 which travels in the same direction as the uppermost conveyor 11. When the potatoes reach the discharge end of this lowermost conveyor 13, they fall off of the conveyor as indicated at 35 and may be distributed onto another conveyor or directly into a packing carton as desired. The purpose of the two flexible canvas partitions 30—30, as noted before, is to direct the forwardly moving stream of hot air from a lower compartment to the compartment disposed immediately thereover and also to serve as a cushioning medium for breaking the fall of the potatoes and to reduce the likelihood of the potatoes becoming bruised as they are discharged from one conveyor to the next succeeding or lower conveyor. Thus, the potatoes are caused to travel in a tortuous or serpentine path in a direction opposite to the tortuous or serpentine path over which the heated air is flowing. Then, too, by reason of the fact that each of the conveyors is disposed wholly in the path of the air, it will be appreciated that the air is caused to flow through the conveyor, as well as on top of it, and the potatoes as they are turned on their respective rollers are hence subjected over their entire outer surfaces to the heating effect of the hot blasts of air.

The endless roller conveyors 11 and 13, since they both travel in the same direction, may be driven by a common driving system shown in dotted lines in Figure 1, and which is designated generally by the reference character 36. This driving system does not per se constitute a part of this invention and, of course, may be of any suitable or conventional construction.

On the other hand, since the conveyor 12 travels in an opposite direction from that of the conveyors 11 and 13, I find it expedient to use a separate drive 37, shown in dotted lines in Figure 1, for effecting motion of this conveyor. Also, if it is so desired, the left hand end of the conveyor 12 may have its supporting shaft connected by a driving system or chain 38, shown in dotted lines in Figure 1, to the supplying or feeding conveyor 27. This arrangement enables the feeding conveyor 27 to be driven by the same driving system as is used for driving the intermediate conveyor 12. It is, of course, to be appreciated that the conveyor 27 may be separately driven by other mechanism, if such an arrangement is more suitable to the particular requirements of a given installation.

As noted before, I have not deemed it necessary to go into all of the details of the conveyors for the respective drives, since these elements of my structure are separately old in the art and may consist equally well of any of the usual or well known constructions.

The process practiced by this apparatus is believed to be substantially evident from the foregoing description of the apparatus. In brief, as noted before, the blast of air travels in a tortuous path through the three compartments 22, 20, and 18 in an opposite direction from the forward travel of the potatoes through these compartments from the supply conveyor 27 to the discharge point 35. During the course of this travel the potatoes are constantly being turned by reason of rotation or rolling of the rollers 14, and hence each potato has its entire surface during this course of travel subjected at some time or other to the drying effects of the heated air being circulated through the chamber. This air does not travel over the tops of the conveyors but in reality travels through and all around the conveyors, so that the potatoes get the full benefit of the stream of air.

As noted previously, the air may, in accordance with the experience had with this invention, have an initial temperature of approximately 145° F. I find that during the course of the travel of this air through the chamber it loses approximately 45° of this temperature, so that when it reaches the discharge duct 29 it in reality only has a temperature of 100° F. This loss of temperature is, of course, occasioned by reason of the action of the air on the film of moisture on each of the potatoes, or, in other words, is utilized in evaporating this moisture from the skins of the potatoes. This film of moisture serves as the medium for enabling all of the moisture to be substantially removed from the skins of the potatoes and also serves as an insulator for preventing the meat or body of the potato inside of the skin from being heated or cooked in any way by the hot blast of air. In fact, I have ascertained upon examining potatoes leaving the device at point 35 after they have traversed the heated area that the temperature of the body of the potato remains unaltered or, in other words, is the same as it was at the time that the potato entered the chamber. I have also ascertained that during this course of travel approximately half a pound of water may be removed per bushel of potatoes.

Potatoes treated in the foregoing manner resist deterioration for relatively long periods of time and may be safely shipped without fear of rot or decay. In fact, potatoes thus treated may now be insured against decay or the formation of the so-called "soft rot."

In résumé, it will be appreciated that my process does not in any way affect the meat or body of the potato but only acts upon the skin of the potato, which is the part of the potato wherein secondary infection usually occurs.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In an apparatus for treating vegetables and fruits, and especially whole potatoes, for shipment and to aid in preventing deterioration during shipment, means for first moistening the edibles, a drying chamber of predetermined size into which the moistened edibles are delivered and including an inlet and an outlet, conveying means in said chamber for conveying the edibles entering said chamber inlet through said chamber and to said outlet, means for forcing heated air into said chamber and over and about the edibles on said conveyor means, said heated air being only of sufficient temperature to effect skin drying of the edibles without cooking them, and means for causing a relative movement of said heated air and said edibles so that substantially the entire outer surface of each edible is subjected to the drying action of the air, said conveying means including a plurality of endless conveyors, and said chamber having partition means for defining a serpentine path through which said air flows, said serpentine path including a multiple of parallel sections in each of which one of said conveyors is disposed, said parallel sections being connected by end bends in each of which is disposed a flexible cushioning element for cushioning the edibles against bruising as they are discharged from one conveyor for delivery to the succeeding conveyor in said path.

ALEXANDER F. ARTHUR.